United States Patent [19]

Kitagawa et al.

[11] Patent Number: 5,204,940

[45] Date of Patent: Apr. 20, 1993

[54] INFERENCE ENGINE WITH CONFLICT RESOLUTION BASED UPON THE AVAILABILITY OF A RESOURCE

[75] Inventors: Tetsuya Kitagawa; Shoichi Kojima, both of Kanagawa, Japan

[73] Assignee: Kabushiki Kaisha Toshiba, Kawasaki, Japan

[21] Appl. No.: 687,516

[22] Filed: Apr. 19, 1991

[30] Foreign Application Priority Data

Apr. 26, 1990 [JP] Japan .................................. 2-112978

[51] Int. Cl.⁵ .......................................... G06F 15/18
[52] U.S. Cl. ..................................................... 395/51
[58] Field of Search .......................................... 395/51

[56] References Cited

U.S. PATENT DOCUMENTS

| 4,697,178 | 9/1987 | Heckel ................................ 395/122 |
| 4,937,755 | 6/1990 | Yokota et al. ......................... 395/51 |
| 4,959,799 | 9/1990 | Yoshiura et al. ....................... 395/51 |

OTHER PUBLICATIONS

"The Handbook of Artifical Intelligence", ISBN 0-865-76-005-5, vol. 1, Artifical Intelligence, Chap. III, A. Barr/E. A. Feigenbaum, C.4. Production System.
"A Fast Algorithm for the Many Pattern/Many Object Pattern Match Problem", Artifical Intelligence 19 (1982) 17-3.

*Primary Examiner*—Michael R. Fleming
*Assistant Examiner*—Jodi E. Tryon
*Attorney, Agent, or Firm*—Oblon, Spivak, McClelland, Maier & Neustadt

[57] ABSTRACT

An inference system is disclosed, the inference system comprising rule storing portion for storing a plurality of production rules, each of which is composed of an "if statement" and a "then statement", fact information storing portion for storing fact information, condition comparing portion for comparing the "if statement" of each production rule stores in the rule storing portion with the fact information stored in the fact information storing portion successively until a resource of the process system or the inference system is consumed, conflict resolving portion for selecting one of at least one production rule obtained as the results of the comparison by the condition comparing portion when the resource is consumed, and rule executing portion for executing the "then statement" of the production rule being selected by the conflict resolving.

11 Claims, 2 Drawing Sheets

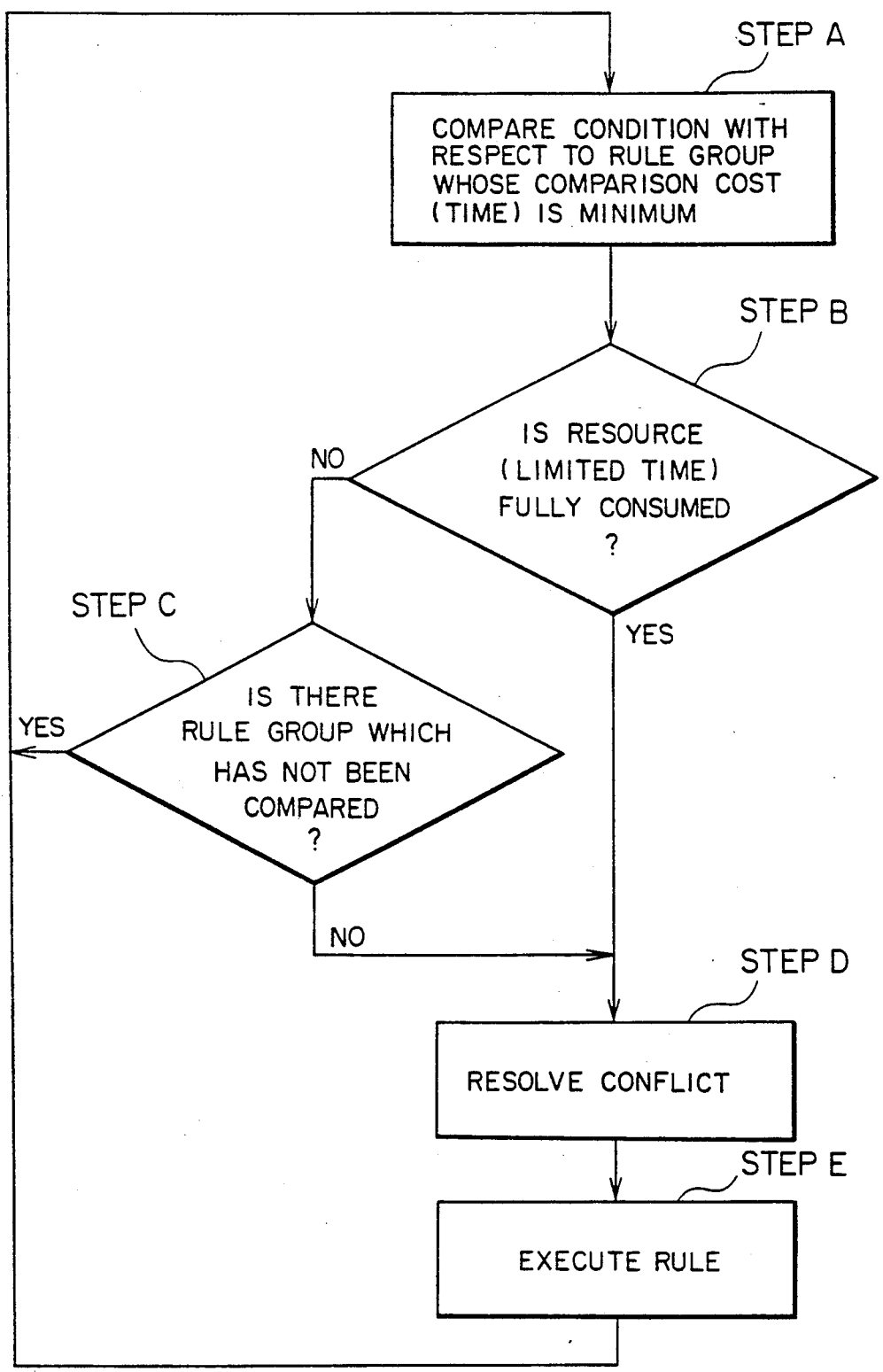

INFERENCE ENGINE WITH CONFLICT RESOLUTION BASED UPON THE AVAILABILITY OF A RESOURCE

BACKGROUND OF THE INVENTION

1. Field of the Invention

The present invention relates to an inference system used in a reactor power plant, a trouble diagnosing system, and so forth.

2. Description of the Related Art

Recently, an inference system using Rete algorithm has been well known as a means for accomplishing an AI machine.

The inference system uses a production rule composed of an "if statement" and a "then statement" to execute an inferential operation.

First, the "if statement" of each of the production rules and of those permitted by another rule or the like is successively compared with current fact information in a working memory. Thus, a plurality of production rules which satisfy each "if statement" are retrieved as candidates. Thereafter, the most suitable one of the production rules being retrieved is selected. Thereafter, the "then statement" of the selected production rule is executed.

The cost of time, memory storage, and so forth used for the comparison of the rules in the inferential operation depends on the contents of the production rules and the working memory.

For example, assume the following two production rules.

Rule 1.
if $(c>1)$
then $A := c + 1.5$
Rule 2.
if $(c>1)$ and $(f(c)>c)$
then $A := c + 1.25$ where $f(c)$ of the rule 2 is a function where the computing time varies depending on the state of "c". Thus, the time required for comparison of the rule 2 depends on the state of "c". In a particular state of "c", the time required for comparison of the rule 2 becomes longer than that for the rule 1.

Thus, when an inference system is used in a process system which should retrieve a subsequent operational candidate with a limited resource (time and memory capacity), a large risk would result.

For example, for controlling a reactor power plant or the like, a particular process should be executed within a particular time after a trouble takes place. However, in the aforementioned inference system, it is not assured that an operational candidate is always selected in the limited time. If an operational candidate is not selected in the limited time, in the worst case, the process operation stops and thereby a critical trouble may take place.

SUMMARY OF THE INVENTION

An object of the present invention is to provide an inference system for securely selecting and executing a "then statement" of a production rule which is one of the minimum requirements for continuing a current process even if the process system has a limitation with respect to the process time, memory capacity, and so forth.

To accomplish the above object, the inference system in accordance with the present invention comprises rule storing means for storing a plurality of production rules, each of which is composed of an "if statement" and a "then statement", fact information storing means for storing fact information, condition comparing means for comparing the "if statement" of each production rule stored in the rule storing means with the fact information stored in the fact information storing means successively until a resource of the process system or the inference system is consumed, conflict resolving means for selecting one of at least one production rule obtained as the result of the comparison by the condition comparing means when the resource is consumed, and rule executing means for executing the "then statement" of the production rule selected by the conflict resolving means.

Thus, according to the present invention, even if a process system which has a limitation with respect to the process time, memory capacity, and so forth is operated, the "then statement" of a production rule which is one of the minimum requirements for continuing the current process can be securely selected and executed within the limited resource.

BRIEF DESCRIPTION OF DRAWINGS

FIG. 2 is a flow chart describing the operation of the inference system shown in FIG. 1.

DESCRIPTION OF PREFERRED EMBODIMENTS

Figure 1:
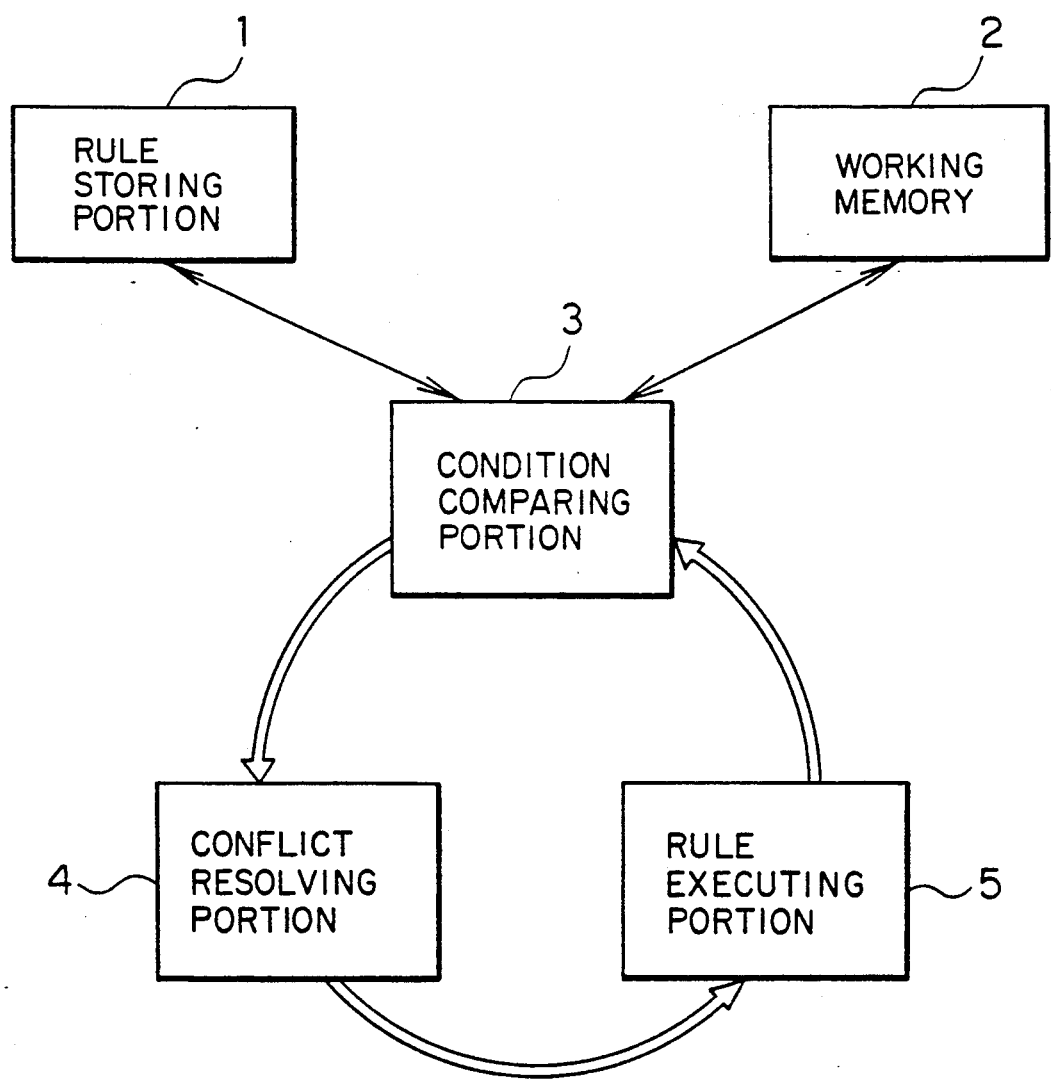
FIG. 1 is a block diagram describing the structure of an inference system in accordance with an embodiment of the present invention.

Now, with reference to the accompanying drawings, an embodiment of the present invention will be described.

FIG. 1 is a block diagram describing the structure of an inference system in accordance with an embodiment of the present invention.

In the figure, reference numeral 1 is a rule storing portion for storing a plurality of production rules each of which is composed of an "if statement" and a "then statement". Each production rule in the rule storing portion 1 can be categorized as a plurality of groups in accordance with the amount of cost required for the comparison.

Reference numeral 2 is a working memory for storing current fact information.

Reference numeral 3 is a condition comparing portion for comparing the "if statement" of each production rule stored in the rule storing portion 1 with the fact information stored in the working memory 2. The comparison in the condition comparing portion 3 is executed from a group where the cost for the comparison is small. The comparison is continued until the resource of the related process system is fully consumed.

Reference numeral 4 is a conflict resolving portion for selecting one of the production rules obtained by the comparison in the condition comparing portion 3. The conflict resolving portion 4 selects one of the production rules obtained until the resource is fully consumed.

Reference numeral 5 is a rule executing portion for executing the "then statement" of the production rule selected by the conflict resolving portion 4.

The resource in the embodiment is a limited time after a particular event takes place until a subsequent operation is started, the limited time being predetermined by the related process system.

The cost in the embodiment is a time required for the comparison for each production rule.

Then, with reference to the flow chart shown in FIG. 2, the operation of the inference system will be described.

The condition comparing portion 3 compares with fact information in the working memory 2 with the "if statement" of each production rule in the group whose comparison time (cost) is the shortest (in step A).

After the comparison for one group is completed, the condition comparing portion 3 determines whether or not the resource (limited time) of the process system has elapsed (in step B).

When the resource (limited time) is still present, the condition comparing portion 3 determines whether or not a production rule group is still present in the rule storing portion 1 (in step C).

When a production rule group which has not been compared is still present, the condition comparing portion 3 compare a rule group whose comparison time (cost) is the second shortest (in step A).

Before the resource (limited time) is consumed, if comparison of all the rule groups in the rule storing portion 1 with the fact information in the working memory 2 has been completed, the conflict resolving portion 4 selects the most suitable rule from the production rules which satisfies the "if statement" (in step D).

Thereafter, the rule executing portion 5 executes the "then statement" of the production rule selected (in step E).

Before the comparison of all the production rules is completed, if the resource (limited time) is fully consumed, the comparison is immediately stopped. The conflict resolving portion 4 selects the most suitable rule from the production rules obtained (in step D).

Thereafter, the rule executing portion 5 executes the "then statement" of the production rule selected (in step E).

As described above, in the inference system according to the embodiment, even if the comparison of all the production rules has not been completed, when the resource (limited time) is fully consumed, a particular production rule is selected and then the "then statement" thereof is executed. Thus, the worst case where the "then statement" of a production rule is not obtained and the process operation is stopped can be prevented. Thus, a safety process system can be accomplished.

In addition, the condition comparing portion 3 compares production rule groups in the order of least to most comparison cost (time). Thus, within the resource (limited time), the condition comparing portion 3 can compare many production rules. The comparison of many production rules helps to obtain a much suitable production rule through the conflict resolution.

In the case where the resource (limited time) has a reasonable allowance or depending on the type of the process system, it is not necessary for the rule storing portion 1 to store production rule groups being categorized.

Moreover, if a function for always monitoring the remaining time is added to the inference system according to the embodiment, when the limited time has elapsed, the comparison can be cancelled in a group by an interrupt process.

The present invention is applied to the case where the storage capacity consumed for storing the results of the rule comparison is the cost required for the comparison.

In addition, the present invention is applied to the case where the overall storage capacity for storing the results of the rule comparison is the resource.

Furthermore, as the cost is also a resource, it is possible to consider communication costs such as data base searching charge, access time, and so forth and time, cost, and so forth required for retrieving information from various measurement equipment in an inference system applied to a trouble diagnosing system.

What is claimed is:

1. An inference system used for a process system having a resource, comprising:
    rule storing means for storing a plurality of production rules, each of which is comprised of an "if statement" and a "then statement";
    fact information storing means for storing fact information;
    condition comparing means for comparing said "if statement" of each production rule stored in said rule storing means with said fact information stored in said fact information storing means based on the availability of the resource of the process system to obtain at least one production rule with said "if statement" being satisfied, said comparing continuing successively when said resource is available;
    conflict resolving means for selecting one of said at least one production rule obtained as the result of the comparison by said condition comparing means based on the availability of the resource of the process system, said selecting occurring when said resource becomes unavailable; and
    rule executing means for executing said "then statement" of said production rule selected by said conflict resolving means.

2. An inference system as set forth in claim 1, wherein said resource is a time between the occurrence of a particular event and the start of a subsequent operation in said process system.

3. An inference system as set forth in claim 1, wherein said resource is an overall storage capacity of a memory for storing the results of the comparison of said production rule.

4. An inference system used for a process system having a resource, comprising:
    rule storing means for categorizing a plurality of production rules, each of which is comprised of a pair of an "if statement" and a "then statement", as a plurality of groups depending on the amount of cost required for the comparison and for storing the categorized production rule groups;
    fact information storing means for storing fact information;
    condition comparing means for comparing said "if statement" of each production rule of each group stored in said rule storing means with said fact information stored in said fact information storing means selectively to obtain at least one production rule with said "if statement" being satisfied, each group being selected based on the amount of cost required for the comparison, the group having the least comparison cost being selected first;
    conflict resolution means for selecting one of said at least one production rule obtained as the result of the comparison by said condition comparing means; and
    rule executing means for executing said "then statement" of said production rule selected by said conflict resolving means.

5. An inference system as set forth in claim 4, wherein said cost is based on a time required for the comparison of said production rule.

6. An inference system as set forth in claim 4, wherein said cost is based on a storage capacity used for storing the results of the comparison of said production rule.

7. An inference system used for a process system having a resource, comprising:

rule storing means for categorizing a plurality of production rules, each of which is comprised of a pair of an "if statement" and a "then statement", as a plurality of groups depending on the amount of cost required for the comparison and for storing the categorized production rule groups;

fact information storing means for storing fact information;

condition comparing means for comparing said "if statement" of each production rule of each group stored in said rule storing means with said fact information stored in said fact information storing means selectively based on the availability of the resource of the process system to obtain at least one production rule with said "if statement" being satisfied, each group being selected based on the amount of cost required for the comparison, the group having the least comparison cost being selected first, said comparing continuing successively when said resource is available;

conflict resolving means for selecting one of said at least one production rule obtained as the result of the comparison by said condition comparing means based on the availability of the resource of the process system, said selecting occurring when said resource becomes unavailable; and rule executing means for executing said "then statement" of said production rule selected by said conflict resolving means.

8. An inference system as set forth in claim 7, wherein said resource is a time between the occurrence of a particular event and the start of a subsequent operation in said process system.

9. An inference system as set forth in claim 7, wherein said resource is an overall storage capacity of a memory for storing the results of the comparison of said production rule.

10. An inference system as set forth in claim 7, wherein said cost is based on a time required for the comparison of said production rule.

11. An inference system as set forth in claim 7, wherein said cost is based on a storage capacity used for storing the results of the comparison of said production rule.

* * * * *